Feb. 21, 1939.  A. C. HEYSER  2,148,390
CLAMP NAIL
Filed Sept. 3, 1935

INVENTOR.
Arthur Chris Heyser
BY Cox & Moore
ATTORNEYS.

Patented Feb. 21, 1939

2,148,390

UNITED STATES PATENT OFFICE 2,148,390

CLAMP NAIL

Arthur Chris Heyser, Chicago, Ill., assignor to Clamp Nail Company, Chicago, Ill., a corporation of Illinois Application September 3, 1935, Serial No. 38,892

2 Claims. (Cl. 85—11)

This invention relates to a dowel and has to do particularly with a flanged and selectedly shaped joint fastener. The articles to be joined are usually at an angle to one another. They may be side by side or end to end or face to face. A plain or a mitered joint, or any other type of joint, may be used.

The primary object of the invention is the provision of a dowel having the advantages of a flat rectangular central web and parallel flanges along the sides of such a web, the flanges flaring at the front or driven end and the web protruding beyond such flanges a substantial distance to form a guiding tongue.

A second object of the invention is the provision of an improved type of dowel having a central web, the driven end being free of flanges and rounded to form a comparatively long guiding tongue.

Another object of this invention is to provide a dowel with a comparatively long sharpened tongue the edge of such tongue being arcuate, and the tongue being narrower than the web of the dowel.

A further object of the invention is the provision of an improved dowel comprising a single piece of suitable material and having a central web, parallel and flaring flanges, and a tongue free from such flanges.

With the above and other desirable objects in view, the invention is hereinafter set forth with reference to the single sheet of drawings hereby made a part of this specification and upon which:

Like reference characters are used to designate similar parts in the drawing and in the description that follows.

Figure 1:
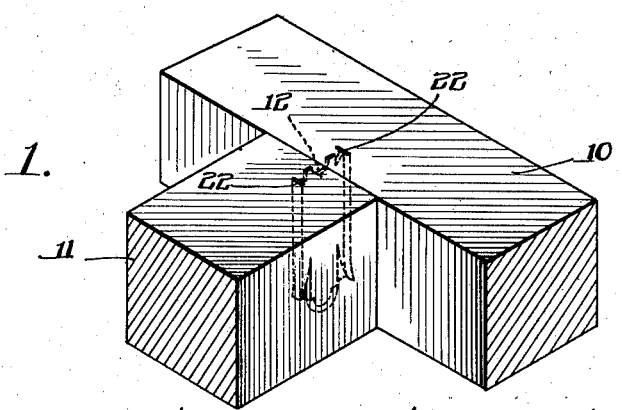
Figure 1 is a perspective view of a T joint in which a dowel embodying the present invention is shown in dotted lines.

In Figure 1 of the drawing, illustrating an embodiment of the invention, there is shown a joint such as one forming part of a frame. Such part comprises a side member 10 and an abutting member 11. Frame members 10 and 11 are joined by means of a dowel 12, shown in dotted lines.

Figure 6:
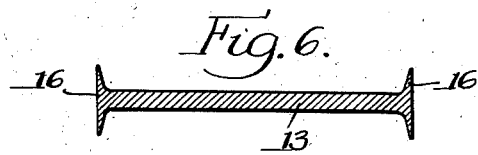
Figure 6 is a similarly enlarged section taken on the line 6—6 of Figure 2.

The dowel 12 has substantially an I cross section as is best shown in Figure 6. It is formed of an integral piece of thin, stiff material, generally metal and has a flat rectangular web 13, a driving end 14, and a driven end having a tongue 15.

Flanges 16 extend along the lateral edges of the web 13. For most of the length of the web the flanges 16 are parallel, but near the tongue 15 the flanges 16 diverge to form flares or flared flange parts 17. The flares 17 terminate in points 18 which are in alignment with the base of the tongue 15. The edges of the flanges 16 and 17 are sharpened or tapered to provide sharp edges, as is shown in Figure 6.

Figure 2:
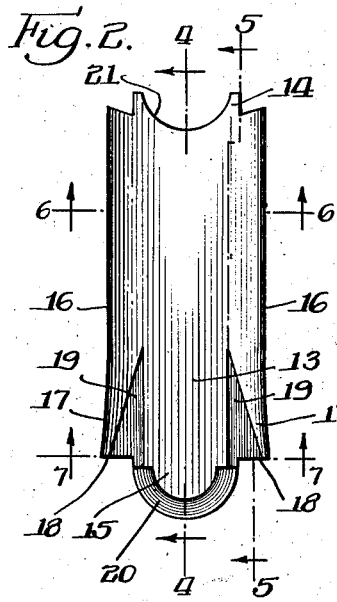
Figure 2 is a face view of the dowel illustrated in Figure 1.
Figure 3:
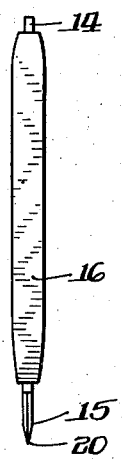
Figure 3 is a side elevation of the dowel illustrated in Figure 2.
Figure 4:
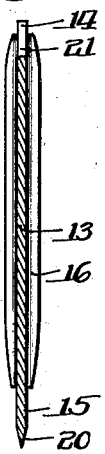
Figure 4 is a section taken on the line 4—4 of Figure 2.
Figure 5:
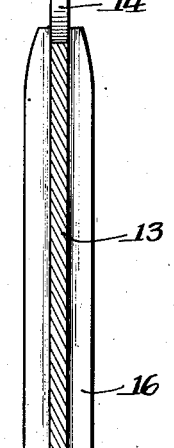
Figure 5 is an enlarged section taken on the line 5—5 of Figure 2.
Figure 7:
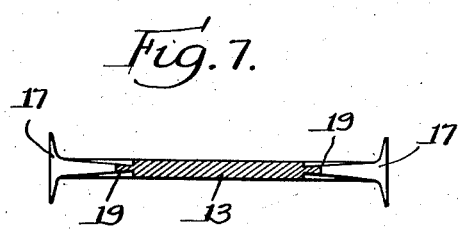
Figure 7 is another similarly enlarged section taken on the line 7—7 of Figure 2.

The flared flanges 17 are formed by swaging the web 13 as indicated at 19. The swaging 19 extends from above the beginnings of the flares and is deepest adjacent the tongue 15, opposite points 18. The swaging is clearly shown in Figures 2, 5 and 7.

The dowels 12 are generally made from a continuous strip of metal, the dowels being cut to the desired length and shape. The tongue 15 is arcuate on its forward edge to provide a guiding and steadying means for the dowel and is long to prevent wobbling of the dowel when it is being driven into abutting frame members. As indicated at 20, the tongue 15 may be sharpened.

When the tongue and driven end of the dowel is cut from a strip of metal, the same cut forms the driving end of the next dowel to be cut from such a strip, the arcuate convex edge of the tongue leaving an arcuate concave driving end 21, for the next dowel. If desired the arcuate driving end may be removed to provide a straight end at right angles to the flanges 16.

Before driving a dowel 12 into a joint, straight saw cuts or kerfs 22 are formed in the frame members 10 and 11. The kerfs 22 extend across the abutting faces of the members 10 and 11 in parallelism. The depth of each kerf 22 preferably is slightly greater than one-half the maximum width of the dowel 12.

The tongue 15 of the dowel 12 is started into the parallel kerfs 22. Then by applying force to the driving end 14, the dowel is driven inwardly of the frame members 10 and 11 in a path determined by the kerfs and guided by the tongue 15.

The length and shape of the tongue 15 provide stability for the dowel during the driving operation. Thus a longer tongue will insure a more steady entrance and passage during the driving operation.

During the driving operation, the flared flanges 17 bite into the material of the frame members 10 and 11 near the bottoms of the kerfs 22, drawing the frame members toward one another. The parallel flanges 16 maintain the relative positions of the frame members 10 and 11 after they have been drawn tightly together by the flaring flanges 17.

What is claimed as new and is desired to be secured by Letters Patent of the United States is:

1. A dowel comprising a web having flanges on opposite sides thereof, a relatively sharpened, arcuate tongue at one end of less width than said web and extending beyond said flanges, said flanges being parallel over a portion of their length and flaring near said tongue, and channels depressed in the body of the web, said channels extending backwardly a substantial distance along the body of the web directly from the tongue.

2. A dowel comprising a web having flanges on opposite sides thereof, a sharpened, substantially semi-circular, protruding tongue at one end of less width than said web and extending beyond said flanges, said flanges being parallel over a portion of their length and flaring near said tongue, and channels depressed in the body of the web, said channels extending backwardly a substantial distance along the body of the web directly from the tongue.

ARTHUR CHRIS HEYSER.